US008136087B2

(12) United States Patent  
Gyure et al.

(10) Patent No.: US 8,136,087 B2  
(45) Date of Patent: Mar. 13, 2012

(54) IN-LINE PROCESSING OF STANDARDIZED TEXT VALUES

(75) Inventors: Wesley J. Gyure, Wake Forest, NC (US); David G. Robinson, Cary, NC (US); Adam Tate, Raleigh, NC (US); Lorraine P. Vassberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 11/782,392

(22) Filed: Jul. 24, 2007

(65) Prior Publication Data

US 2009/0030913 A1    Jan. 29, 2009

(51) Int. Cl.
G06F 9/44        (2006.01)
G06F 7/00        (2006.01)
G06F 9/445       (2006.01)

(52) U.S. Cl. ........ 717/104; 717/106; 717/107; 717/109; 717/126; 717/178; 707/602

(58) Field of Classification Search .................. None
See application file for complete search history.

(56) References Cited

U.S. PATENT DOCUMENTS

| | | | | |
|---|---|---|---|---|
| 7,117,215 B1* | 10/2006 | Kanchwalla et al. | ......... | 707/602 |
| 7,827,527 B1* | 11/2010 | Chiluvuri | ...................... | 717/109 |
| 2002/0199171 A1* | 12/2002 | Dharamshi | .................... | 717/126 |
| 2005/0204334 A1* | 9/2005 | Parthasarathy et al. | ....... | 717/107 |
| 2005/0216498 A1* | 9/2005 | Georgalas et al. | ............. | 707/102 |
| 2005/0229152 A1* | 10/2005 | Connell et al. | ................ | 717/104 |
| 2007/0106711 A1* | 5/2007 | Buros et al. | ................... | 707/204 |
| 2007/0112825 A1* | 5/2007 | Cook et al. | .................... | 707/102 |
| 2007/0112876 A1* | 5/2007 | Blaisdell et al. | ............. | 707/201 |
| 2008/0082959 A1* | 4/2008 | Fowler | ........................... | 717/104 |
| 2008/0222631 A1* | 9/2008 | Bhatia et al. | ................. | 717/178 |

OTHER PUBLICATIONS

Stoyanov et al, "Oracle SQL Developer Data Modeler Naming Standardization", Jun. 2009, pp. 1-20, Oracle Corporation <http://www.google.com/#hl=en&q=standardized+database+access,+%22standardization%22+rules,+class+template>.*

Swigger et al., "Research issues related to exchanging information from heterogeneous data sources", May 2006, ACM, pp. 45-46, <http://dl.acm.org/results.cfm?query=database%20standardization>.*

Alhajj et al., "Reengineering Relational Databases to Object-Oriented: Constructing the Class Hierarchy and Migrating the data", 2002 IEEE, pp. 335-344, <http://ieeexplore.ieee.org/search/searchresult.jsp?newsearch=true&queryText=data+object+model+database>.*

* cited by examiner

*Primary Examiner* — Thuy Dao  
*Assistant Examiner* — Ben Wang  
(74) *Attorney, Agent, or Firm* — Yudell Isidore Ng Russell PLLC

(57) ABSTRACT

A method of in-line processing of standardized text values. A standardization utility defines multiple standardization rules in response to user input from a graphical user interface (GUI). The standardization rules correspond to text and integer data in a database. The standardization utility generates a JAVA class template for each data model object that requires standardization. The standardization utility generates public methods for each data attribute that corresponds to a standardization rule and converts the public methods into JAVA code. The standardization utility compiles the JAVA code into multiple helper classes and stores the helper classes within a JAVA Archive (JAR) file in the library path of applications that input text into the database. The standardization utility assigns a tracking number to each new helper class. The standardization utility loads the helper classes into JAVA Virtual Machines (JVMs) that are accessible to applications capable of inputting data into the database.

9 Claims, 3 Drawing Sheets

IN-LINE PROCESSING OF STANDARDIZED TEXT VALUES

BACKGROUND OF THE INVENTION

The present invention relates in general to data processing systems and in particular to using computers to merge data from multiple sources into a common database.

A data warehouse is a central repository of multiple databases that include the historical data of a company or organization. Data warehouses contain large amounts of data that may be utilized to support management decisions. A data analyst may utilize a data warehouse to perform complex queries and analysis without slowing down other operational systems. A data warehouse is thus optimized for reporting and analysis to minimize query response times. Databases within a data warehouse therefore include data in a consistent standardized format. Standardization is the process of checking and converting text and/or integer values in a data attribute to a predefined format or a set of predefined values. Before the data of a standardized attribute is stored in a common repository, the value in the attribute is compared against a set of rules that govern how the data must be formatted, and if necessary, the data is converted to fit the format defined by the rules.

Tools and code that perform standardization of values being entered into a database are typically configured to be aware of multiple data attributes and to transform one record at a time to a standardized value based on the dependencies between component values. The sum of serialized standardization operations can add significant time to data loading operations. Also, data that is standardized with Extract-Transform-Load (ETL) tools, which are typically located "outside" an application, can create maintenance problems if attempts are made to standardize values at multiple locations, since the standardization checkpoints at each location can get out of synch. Furthermore, it may be problematic to share a standardization "rule set" among multiple applications in a data warehousing environment. When the standardization rules change, older previously stored data must be updated. Conventional ETL tools also increase processing overhead by applying standardization rules to all incoming data, regardless of whether or not the data originated from a "trusted" source.

SUMMARY OF AN EMBODIMENT

Disclosed are a method, system, and computer program product for in-line processing of standardized text values. A standardization utility defines multiple standardization rules in response to user input from a graphical user interface (GUI). The standardization rules correspond to valid values for a model object attribute for either text or integer values stored in a public database. If no standardization rules are defined for a model object, the standardization utility generates a boiler plate JAVA® class template for that model object that performs no standardization checks for any attributes (JAVA® is a registered trademark of Oracle). The methods in the boiler plate JAVA class are essentially empty methods. If standardization rules are defined for a model object, the standardization utility generates a JAVA class template for that model object, where the methods in the JAVA class apply standardization logic. Each method in the JAVA class template corresponds to a "setter" method in the main model object for which a helper class was generated. The standardization utility compiles the Java code into multiple helper classes and stores the helper classes within a JAVA Archive (JAR) file in the library path of one or more applications that input text into the database. The standardization utility assigns a tracking number to each new helper class to identify the specific instance of the helper class and which version of the standardization rules each particular helper class implements. The standardization utility loads the helper classes into JAVA Virtual Machines (JVMs) that are accessible to applications capable of applying the standardization rules automatically when inputting text data into the database.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for performing in-line processing of standardized text values when merging data from multiple sources into a common database.

Figure 1:
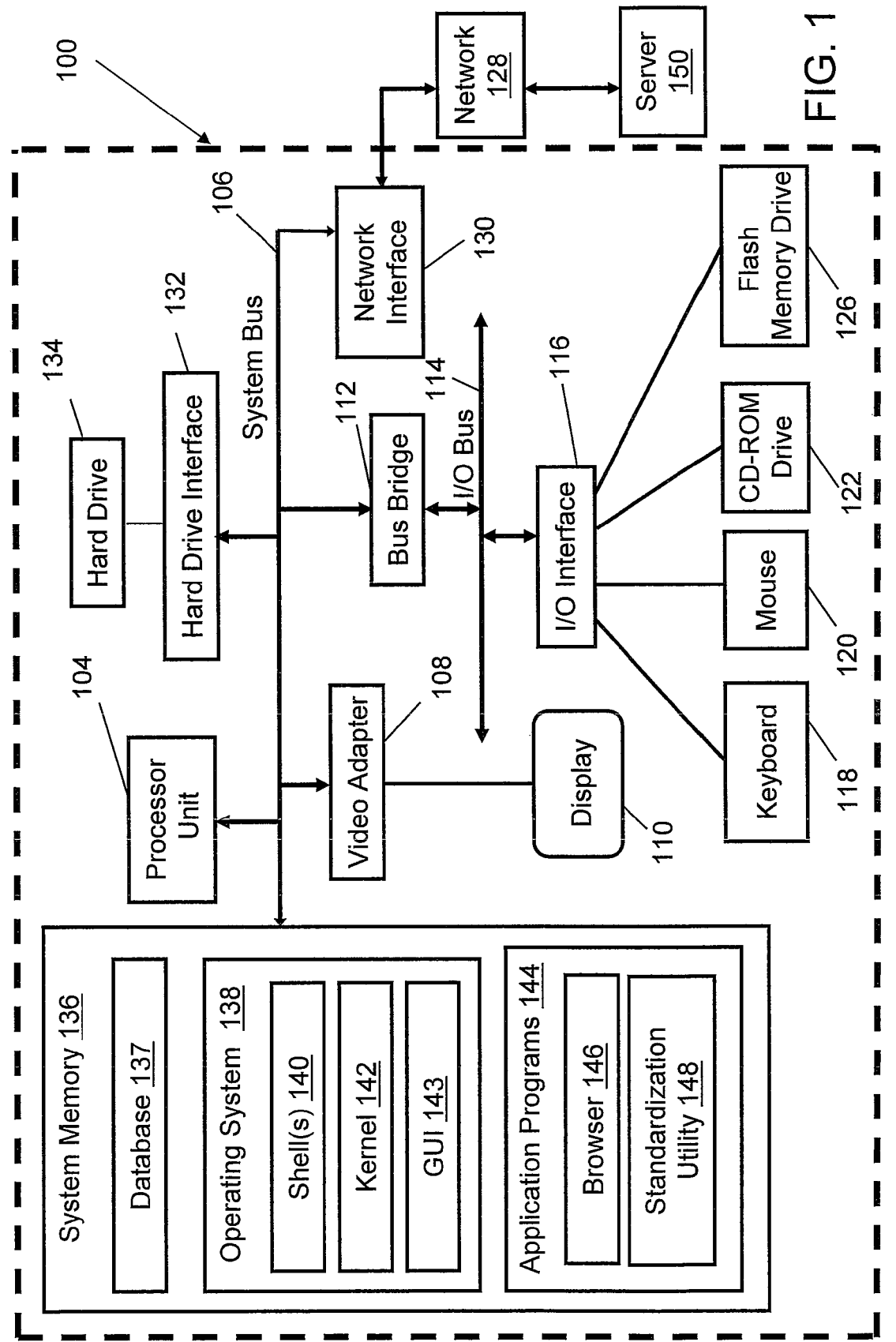
FIG. 1 depicts a high level block diagram of an exemplary computer, according to an embodiment of the present invention.

With reference now to FIG. 1, there is depicted a block diagram of an exemplary computer 100, with which the present invention may be utilized. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100.

Figure 2:
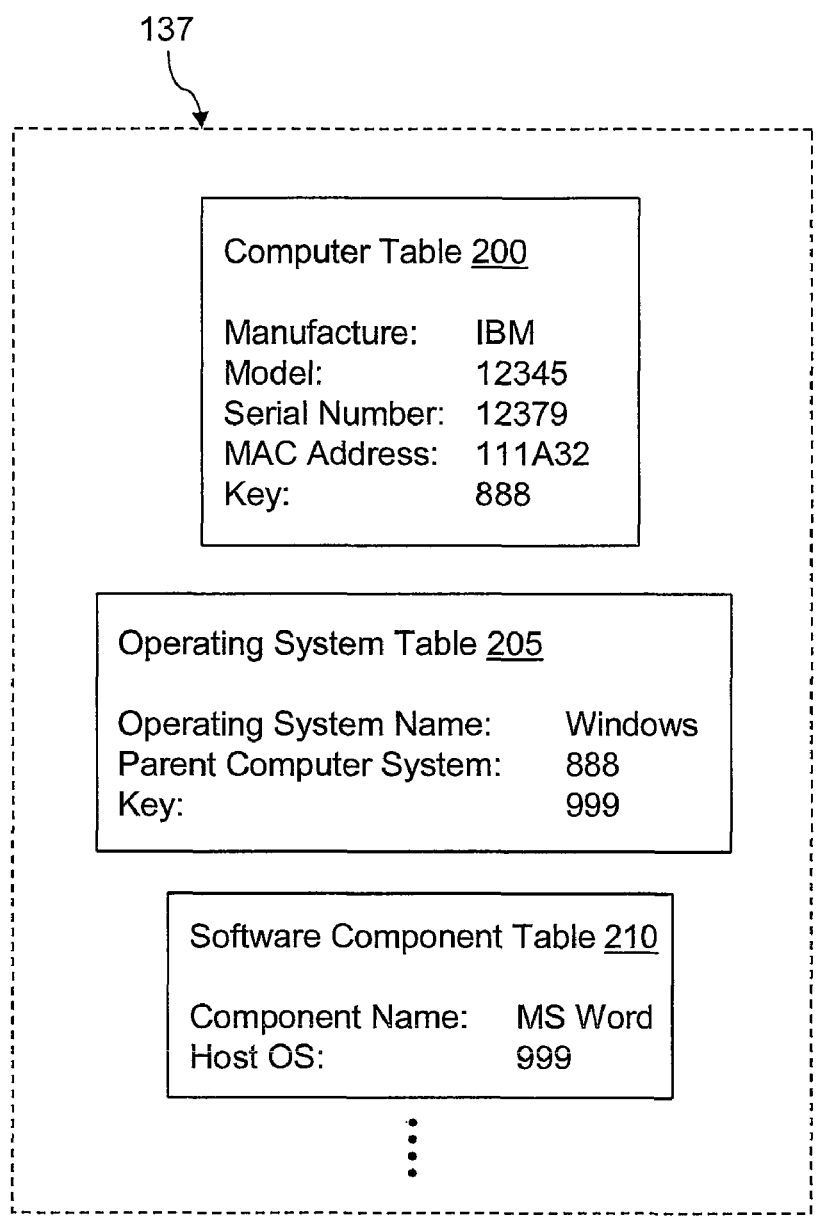
FIG. 2 illustrates an exemplary standardized database, according to an embodiment of the present invention.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes Operating System (OS) 138, application programs 144, and database 137. Database 137 includes multiple records of standardized business data. Database 137 is illustrated in FIG. 2, which is discussed below. In another embodiment, database 137 may instead be stored in server 150.

OS 138 includes shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146 and standardization utility 148. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Standardization utility 148 performs the functions illustrated in FIG. 3, which is discussed below. In one embodiment, standardization utility 148 is a code generation program, such as a Tivoli Application Dependency Discovery Manager (TADDM), that is called via an Application Programming Interface (API). Standardization utility 148 is capable of writing JAVA classes into a file system that is accessible to multiple users, such as a Configuration Management Database (CMDB).

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

With reference now to FIG. 2, there is depicted an exemplary standardized database, according to an embodiment of the present invention. As shown, database 137 includes computer table 200 and operating system table 205. Database also includes software component table 210, which corresponds to operating system table 205. According to the illustrative embodiment, database 137 includes a table for every model object in a data model (e.g., the Tivoli common data model). The data standardization method is illustrated in FIG. 3, which is discussed below.

Figure 3:
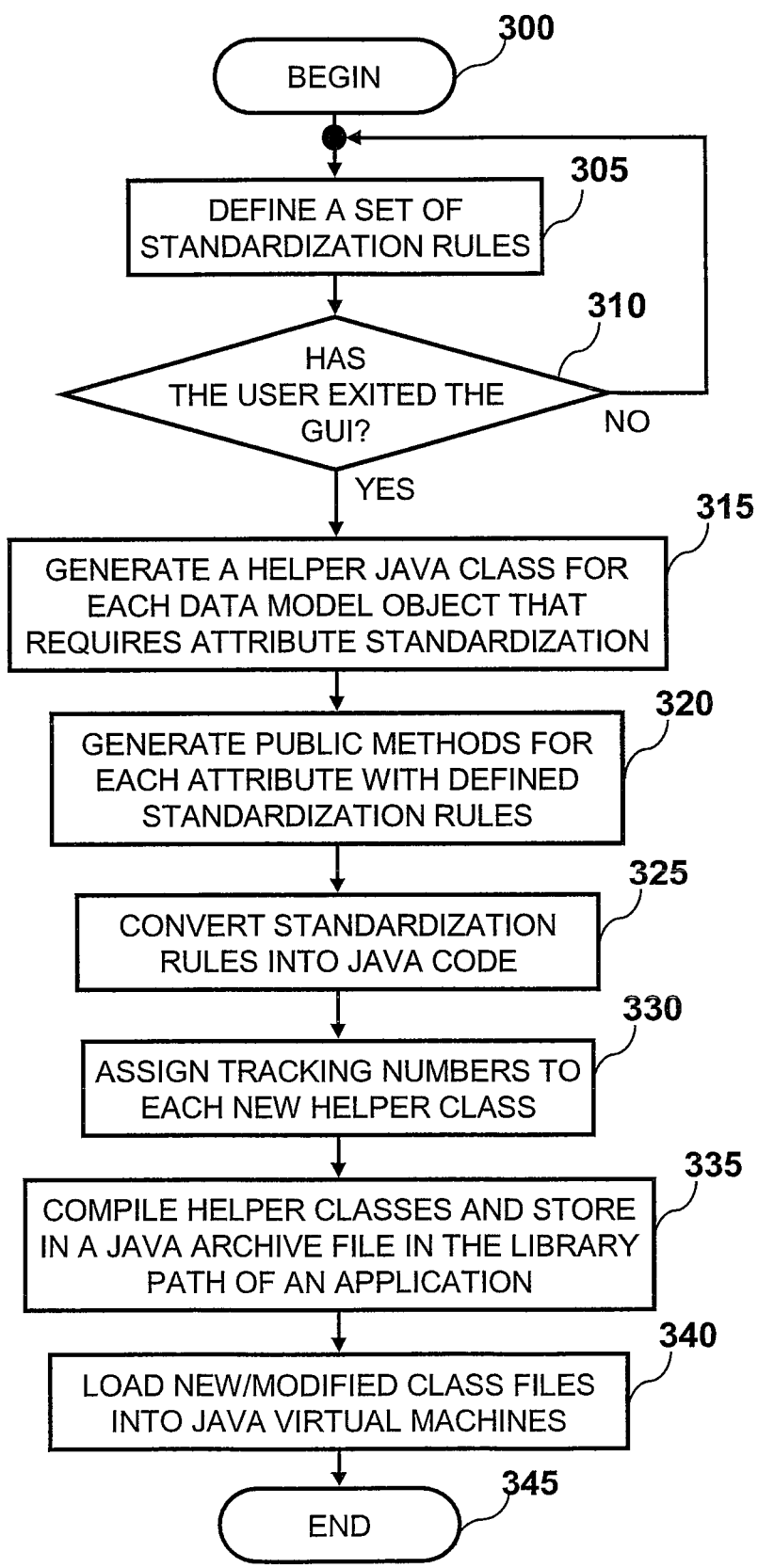
FIG. 3 is a high level logical flowchart of an exemplary method of in-line processing of standardized text values, according to an embodiment of the invention.

Turning now to FIG. 3, there is illustrated a high level logical flowchart of an exemplary method of in-line processing of standardized text values, according to an embodiment of the invention. The process begins at block 300 in response to a user of computer 100 entering a command into GUI 143. A user enters one or more standardization rules via GUI 143, as depicted in block 305. For example, a user defines the standardization rules applied to an attribute on a model object (i.e., JAVA class). The user selects a model object and an attribute on the selected model object. The user subsequently defines one or more rules regarding what the data in the selected attribute should look like. After defining rules for one attribute, the user can define rules for another attribute and/or model object.

As utilized herein, a standardization rule refers to a rule that can be defined for each JAVA class in a data model and/or for each attribute in a JAVA class. Standardization rules are fully customizable by users of computer 100. Standardization utility 148 assigns the standardization role to the data objects themselves, which execute the standardization rules inline as if the rules were hard coded into the base code of the system (i.e., "built in" to all data handling functions). The present invention thus makes the centralization and "externalization" of standardization logic unnecessary. Standardization rules may be simple, such as a rule listing a one to one conversion of one value to another (e.g., a rule that coverts attribute value "International Business Machines" to "IBM"). Standardization rules may also be complex, such as a rule that utilizes regular expressions and multiple attributes to determine the final value of an attribute (e.g., a rule that converts the attribute values "I*B*M*" and "Lotus Notes" to the single attribute value "IBM").

At block 310, standardization utility 148 determines whether a user has exited GUI 143. If the user has not exited GUI 143, the process returns to block 305 and the user enters additional standardization rules. Once the user exits GUI 143, standardization utility 148 generates a standardization JAVA helper class (i.e., a Java class template) for each data model object that requires attribute standardization, as shown in block 315. In one embodiment, the name of each new JAVA class closely matches the name of the data model class for which the user defined standardization rules. For example, if a model object is called "ComputerSystem", then the helper class that standardization utility 148 automatically generates may be called "ComputerSystemStd" or "ComputerSystemStdHelper". Each method in the JAVA class template corresponds to a "setter" method in the main model object for which a helper class was generated. As utilized herein, a setter method refers to code that enables one or more values to be placed in a model object.

Standardization utility 148 generates public methods (i.e., methods accessible to all applications and/or users) for each attribute for which the user defined standardization rules, as depicted in block 320. In one embodiment, standardization utility 148 names the public methods using naming rules consistent with the corresponding data model object. Due to method naming conventions in a data model, standardization utility 148 names attributes that correspond to the data model by pre-pending the name of the attribute with the action that the method performs. For example, a model object that contains an attribute called "attrOne" has methods named "setAttrOne", "getAttrOne", and "hasAttrOne".

Standardization utility 148 converts standardization rules from database 137 into JAVA code, as shown in block 325. In another embodiment, standardization utility 148 may instead use a programming language other than JAVA to convert standardization rules into a type of code other than JAVA code. According to the illustrative embodiment, standardization utility 148 generates a method called "standardizeAttrOne" from the standardization rules stored within database 137. The conversion process is efficient because the rule definitions are stored within database 137 in a form that is very close to JAVA code. Standardization utility 148 adds multiple if/then clauses to the body of a method if multiple rules exist for a single attribute. Since standardization is performed on data values when the data is initially set into the corresponding data objects, the performance overhead associated with standardization is minimized.

Standardization utility 148 assigns a tracking number to each new helper class, as depicted in block 330. Each tracking number identifies the version of a generated helper class. In one embodiment, each tracking number is a static variable in a class definition that includes a randomly generated integer value. APIs within each helper class enable the helper classes to access the tracking numbers. Each data model class sets a corresponding tracking number as an attribute in the data of the class.

Once standardization utility 148 generates all of the helper classes, standardization utility 148 compiles the helper classes using a JAVA compiler, stores the compiled helper classes in a JAVA Archive (JAR) file, and copies the JAR file into the library paths of installed applications, as shown in block 335. The standardization rules are thus compiled into easily shareable components that can be used by multiple applications, regardless of the particular data model typically used by an application. In one embodiment, changes to the helper classes are made on server 150, and portal GUIs within each computer in network 128 automatically detect changes to the helper classes. JAVA Web Start GUIs automatically pick up a new JAR file when standardization utility 148 establishes a new connection and/or downloads a new helper JAR file.

Server 150 checks the latest tracking number against the incoming tracking numbers of new and/or updated data objects. Standardization utility 148 thus replaces older versions of the helper classes as needed based on verification of the tracking number that is passed inside each model object on server 150. Standardization utility 148 loads the new and/or modified class files into one or more JAVA Virtual Machines (JVMs) that have access to the corresponding data model objects, as depicted in block 340, and the process terminates at block 345. Data that was previously stored using old (i.e., obsolete) standardization rules is automatically standardized upon retrieval from database 137, thereby making "fix up" logic unnecessary.

In one embodiment, JVMs that utilize the data model objects corresponding to the new and/or modified class files are re-started in order to load the new class files. In another embodiment, the JVMs utilize dynamic class loading and thus do not require a re-start. The main data model classes, such as "ComputerSystem", are already coded to call their helper classes during standardization. Users of computer 100 may selectively turn off standardization "on the fly" on a case by case basis (e.g., when data is received from trusted applications). Standardization utility 148 may also determine automatically whether or not standardization should take place for particular input data based on the source of the input data based on a Boolean value that corresponds to whether or not a source is a trusted source. As long as an application understands the correct helper API to call, the application can apply the corresponding standardization rule.

The present invention thus provides an improved method of in-line processing of standardized text values. Standardization utility 148 defines multiple standardization rules in response to user input from GUI 143. The standardization rules correspond to text data, integer data, and/or other data types stored in database 137. Standardization utility 148 generates a boiler plate JAVA class template for each data model object that requires standardization. The standardization utility generates multiple public methods for each data attribute that corresponds to a standardization rule and converts the public methods into JAVA code. Standardization utility 148 compiles the Java code into multiple helper classes and stores the helper classes within a JAR file in the library path of one or more applications that input text into database 137. Standardization utility 148 assigns a tracking number to each new helper class. Standardization utility 148 loads the helper classes into JVMs that are accessible to applications capable of inputting text data into database 137. The present invention also applies to "probabilistic" standardization techniques, as long as the probabilistic standardization rules are compiled into one or more helper classes.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method comprising:
defining a plurality of standardization rules corresponding to data stored in a database;
generating a Java class template for a data model object corresponding to said data;
generating a plurality of public methods for a plurality of data attributes of said data, wherein said public methods correspond to said plurality of standardization rules;
converting said plurality of public methods into Java code;
assigning a tracking number to each of a plurality of helper classes;
compiling said Java code into said plurality of helper classes in a Java archive (JAR) file; and
loading said plurality of helper classes into a plurality of Java Virtual Machines (JVMs) accessible to a plurality of application programs capable of inputting said data into said database and being distributed on a network, wherein said plurality of helper classes modify said data in said database using said standardization rules;
wherein said tracking number is utilized for:
determining which of said plurality of standardization rules were applied to each of said plurality of helper classes in a distributed computing environment,
determining which of said plurality of helper classes are out of date in said distributed computing environment, and
determining which of said plurality of helper classes were generated most recently in said distributed computing environment.

2. The method of claim 1, wherein converting said plurality of public methods into Java code further comprises assigning a tracking number to each of said plurality of helper classes.

3. The method of claim 1, further comprising automatically turning off said plurality of standardization rules when said data is received from one of a plurality of trusted application programs.

4. A computer system comprising:
- a processor unit;
- a system memory coupled to said processor unit;
- a database within said system memory;
- a graphical user interface (GUI) within said system memory; and
- a standardization utility within said system memory, wherein said standardization utility executes on the processor unit to perform the functions of:
  - defining a plurality of standardization rules corresponding to data stored in said database;
  - generating a Java class template for a data model object corresponding to said data;
  - generating a plurality of public methods for a plurality of data attributes of said data, wherein said public methods correspond to said plurality of standardization rules;
  - converting said plurality of public methods into Java code;
  - assigning a tracking number to each of a plurality of helper classes;
  - compiling said Java code into said plurality of helper classes in a Java archive (JAR) file; and
  - loading said plurality of helper classes into a plurality of Java Virtual Machines (JVMs) accessible to a plurality of application programs capable of inputting said data into said database and being distributed on a network,
  - wherein said plurality of helper classes modify said data in said database using said standardization rules,
  - wherein said tracking number is utilized for:
    - determining which of said plurality of standardization rules were applied to each of said plurality of helper classes in a distributed computing environment,
    - determining which of said plurality of helper classes are out of date in said distributed computing environment, and
    - determining which of said plurality of helper classes were generated most recently in said distributed computing environment.

5. The computer system of claim 4, wherein the standardization utility performing the function of converting said plurality of public methods into Java code further comprises the standardization utility performing the function of assigning a tracking number to each of said plurality of helper classes.

6. The computer system of claim 4, wherein the standardization utility further executes on the processor unit to provide the function of automatically turning off said plurality of standardization rules when said data is received from one of a plurality of trusted application programs.

7. A computer program product comprising:
- a non-transitory computer storage medium; and
- program code on said non-transitory computer storage medium that when executed provides the functions of:
  - defining a plurality of standardization rules corresponding to data stored in a database;
  - generating a Java class template for a data model object corresponding to said data;
  - generating a plurality of public methods for a plurality of data attributes of said data, wherein said public methods correspond to said plurality of standardization rules;
  - converting said plurality of public methods into Java code;
  - assigning a tracking number to each of a plurality of helper classes;
  - compiling said Java code into said plurality of helper classes in a Java archive (JAR) file; and
  - loading said plurality of helper classes into a plurality of Java Virtual Machines (JVMs) accessible to a plurality of application programs capable of inputting said data into said database and being distributed on a network,
  - wherein said plurality of helper classes modify said data in said database using said standardization rules,
  - wherein said tracking number is utilized for:
    - determining which of said plurality of standardization rules were applied to each of said plurality of helper classes in a distributed computing environment,
    - determining which of said plurality of helper classes are out of date in said distributed computing environment, and
    - determining which of said plurality of helper classes were generated most recently in said distributed computing environment.

8. The computer program product of claim 7, wherein the program code that performs the function of converting said plurality of public methods into Java code further comprises program code that when executed performs the functions of assigning a tracking number to each of said plurality of helper classes.

9. The computer program product of claim 7, further comprising program code that when executed performs the functions of automatically turning off said plurality of standardization rules when said data is received from one of a plurality of trusted application programs.

* * * * *